United States Patent
Dupuy et al.

(10) Patent No.: US 8,588,114 B2
(45) Date of Patent: Nov. 19, 2013

(54) DIFFERENTIAL POWER AMPLIFIER ARCHITECTURES

(75) Inventors: Alexandre Dupuy, San Diego, CA (US); Can Zheng, San Diego, CA (US)

(73) Assignee: Hollinworth Fund, L.L.C., Dover, DE (US)

( * ) Notice: Subject to any disclaimer, the term of this patent is extended or adjusted under 35 U.S.C. 154(b) by 272 days.

(21) Appl. No.: 13/091,542

(22) Filed: Apr. 21, 2011

(65) Prior Publication Data

US 2011/0261734 A1 Oct. 27, 2011

Related U.S. Application Data

(60) Provisional application No. 61/326,374, filed on Apr. 21, 2010.

(51) Int. Cl.
  *H04L 5/00* (2006.01)
(52) U.S. Cl.
  USPC .......................................................... 370/297
(58) Field of Classification Search
  USPC .......................................... 370/297, 282, 284
  See application file for complete search history.

(56) References Cited

U.S. PATENT DOCUMENTS

| | | | |
|---|---|---|---|
| 4,904,966 A * | 2/1990 | Rubin | 333/120 |
| 7,839,236 B2 | 11/2010 | Dupuy et al. | |
| 7,855,696 B2 * | 12/2010 | Gummalla et al. | 343/876 |
| 8,334,734 B2 * | 12/2012 | Achour | 333/185 |
| 2008/0232506 A1 * | 9/2008 | Fujita et al. | 375/295 |
| 2009/0295473 A1 | 12/2009 | Dupuy et al. | |
| 2010/0062730 A1 * | 3/2010 | Yoon et al. | 455/90.2 |
| 2010/0207703 A1 | 8/2010 | Dupuy et al. | |
| 2010/0260082 A1 * | 10/2010 | Lum et al. | 370/297 |

OTHER PUBLICATIONS

Itoh, "Invited paper: Prospects for Metamaterials," Electronics Letters, vol. 40, No. 16 (Aug. 2004).

* cited by examiner

*Primary Examiner* — Mark Rinehart
*Assistant Examiner* — Mohammad Anwar
(74) *Attorney, Agent, or Firm* — Novak Druce Connolly Bove + Quigg LLP (57) ABSTRACT

In one embodiment, a differential power amplifier structure includes a transceiver module supporting multiple frequency band signals, a plurality of power amplifiers coupled to the transceiver module, each of the plurality of power amplifiers having at least two outputs having 180° phase offset therebetween, and a plurality of filters coupled to the plurality of power amplifiers.

22 Claims, 15 Drawing Sheets

FIG. 13

DIFFERENTIAL POWER AMPLIFIER ARCHITECTURES

CLAIM OF PRIORITY

This application claims the benefit of priority under 35 U.S.C. 119(e) to U.S. Provisional Patent Application Ser. No. 61/326,374, entitled "DIFFERENTIAL POWER AMPLIFIER ARCHITECTURES," filed on Apr. 21, 2010, which is hereby incorporated herein by reference in its entirety.

BACKGROUND

The present discussion relates to Radio Frequency (RF) components, including power amplifiers. Wireless devices require RF components to prepare signals for transmission and to process received signals. It is desirable that RF components be minimal in size and configured for a variety of device designs.

DESCRIPTION

The present discussion relates to differential power amplifier architectures based on Composite Right and Left Handed (CRLH) structures. The differential power amplifier structures may be configured to use a variety of structures.

Implementations and properties of various CRLH structures are described in, for example, Caloz and Itoh, "Electromagnetic Metamaterials: Transmission Line Theory and Microwave Applications," John Wiley & Sons (2006). CRLH structures and their applications in antennas are described by Tatsuo Itoh in "Invited paper: Prospects for Metamaterials," Electronics Letters, Vol. 40, No. 16 (August, 2004). Designs, implementations and variations of multiband power combiners/dividers based on CRLH structures are described, for example, in the U.S. patent application Ser. No. 11/963,710, entitled "Power Combiners and Dividers Based on Composite Right and Left Handed Metamaterial Structures," filed on Dec. 21, 2007. Designs, implementations and variations of diplexers, multiplexers, power amplifying systems, and other RF components and systems based on CRLH structures are described, for example, in the U.S. patent application Ser. No. 12/474,270, entitled "Power Amplifier Architectures," filed on May 28, 2009; and Ser. No. 12/708,437, entitled "Metamaterial Power Amplifier Systems," filed on Feb. 18, 2010.

Figure 1:
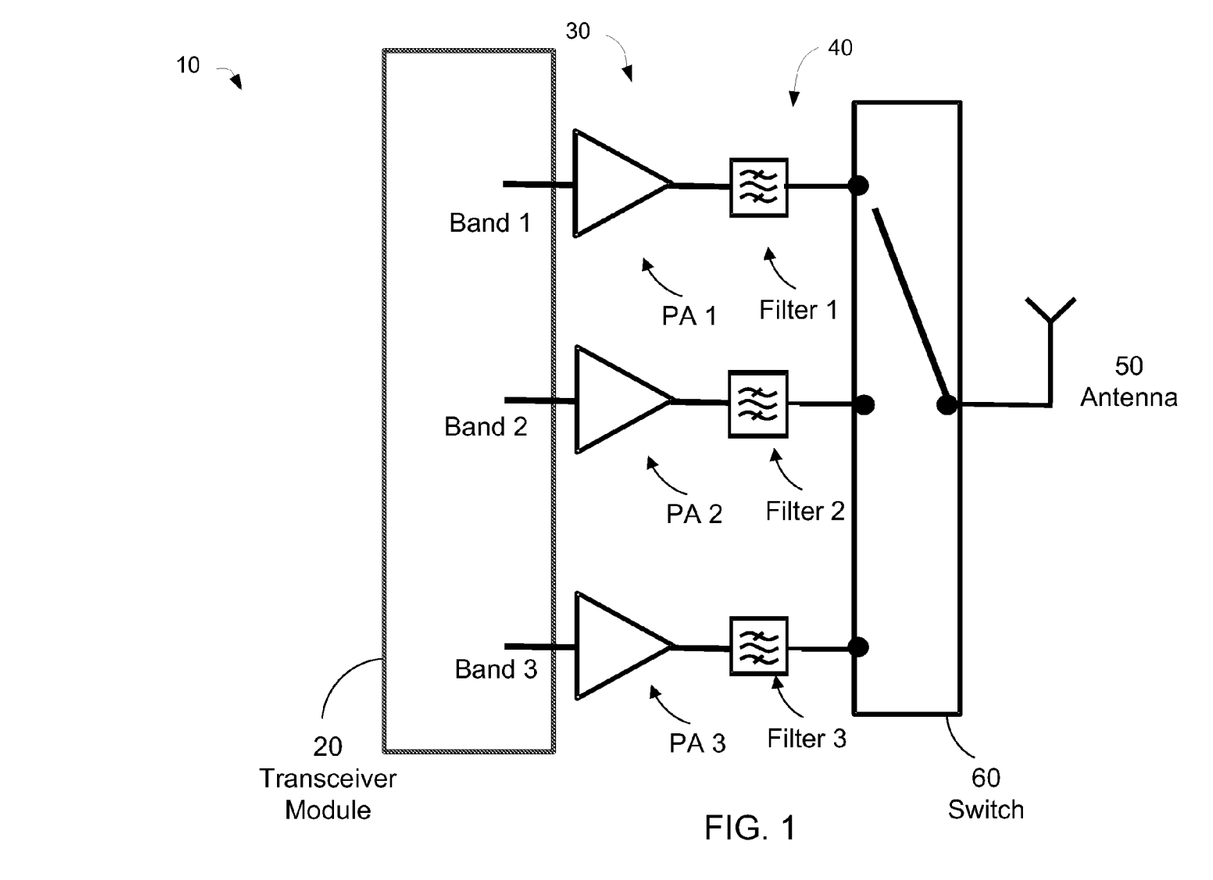
FIGS. 1-2 illustrate power amplifier architectures, according to example embodiments.

FIG. 1 illustrates an example of a power amplifier architecture 10 coupled to an antenna 50. A transceiver module 20 processes base-band signals in multiple bands. Only the transmit (Tx) paths and components for three bands, band 1, band 2, and band 3, are schematically illustrated in the example of FIG. 1. The base-band signals processed by the transceiver module 20 are input to Power Amplifiers (PAs) 30, PA 1, PA 2 and PA 3, through respective pin-outs associated with the band 1, band 2 and band 3. The input signals are amplified by the PAs to generate output signals; the output signals are transmitted to respective filters 40 (filter 1, filter 2 and filter 3). A switch 60, such as an Single-Pole Tri-Throw (SP3T) switch 60 is used in some embodiments to select one of the signal paths to send the signal in the selected band to the antenna.

Figure 2:
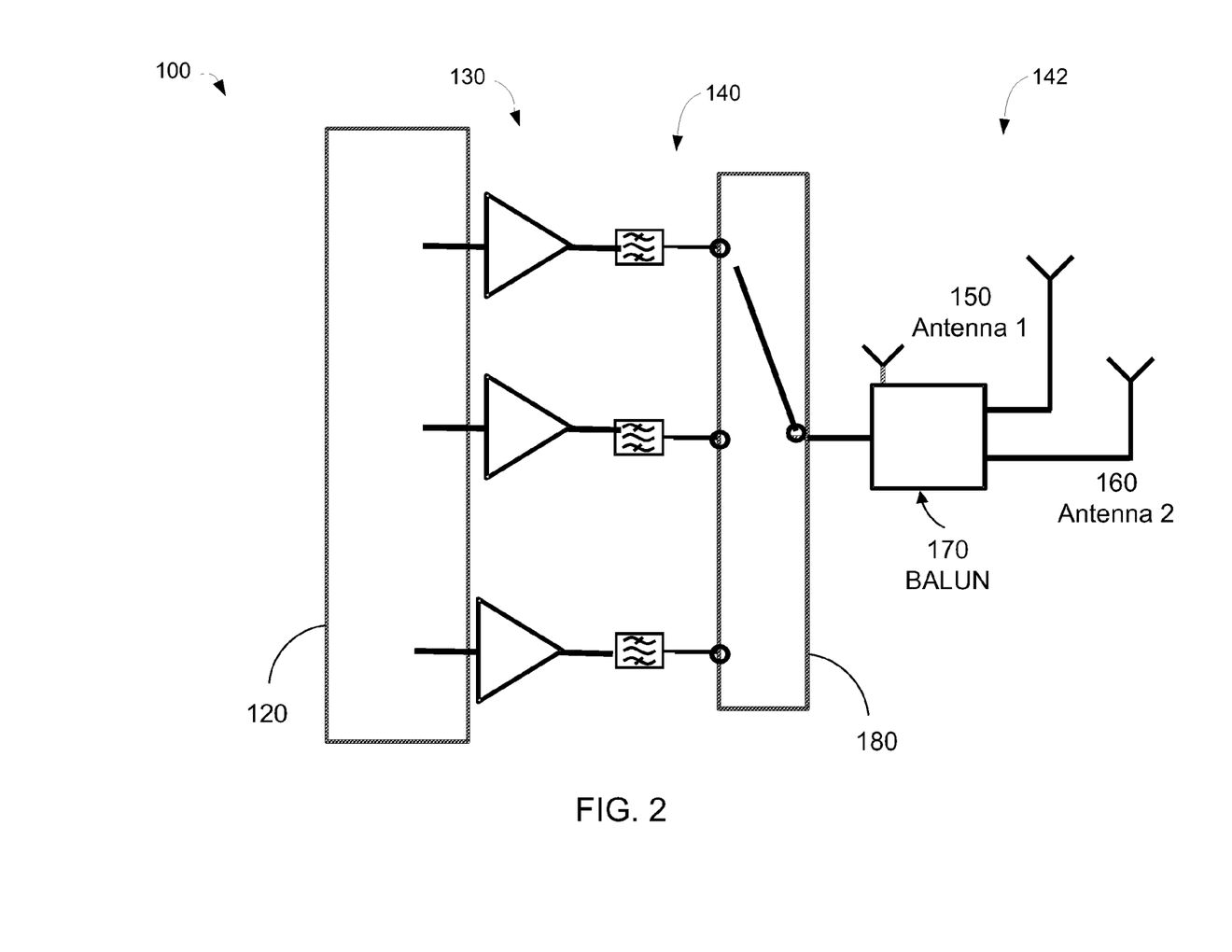

FIG. 2 illustrates another example of a power amplifier architecture 100, which is similar to the architecture 10 of FIG. 1, including transceiver module 20, PAs 130, filters 140, and switch 142, wherein instead of a single antenna a balanced antenna 142 is coupled to the switch 180. The balanced antenna 142 has separate antennas 150 and 160 coupled through a BALUN 170 so as to introduce a 180° phase difference for signal balancing between the antennas 150, 160.

Figure 3:
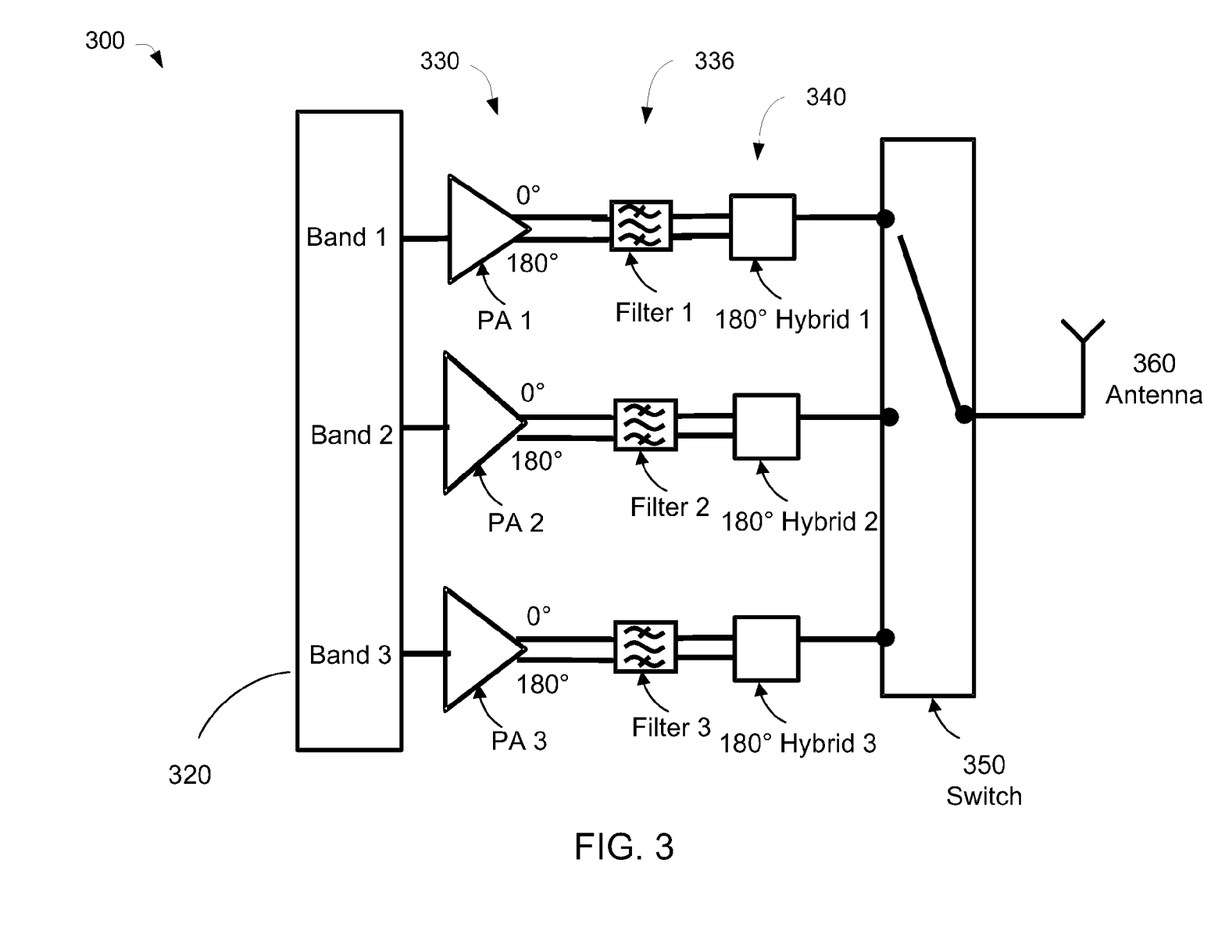
FIG. 3 illustrates a differential power amplifier architecture, according to example embodiments.

FIG. 3 illustrates an example of a differential power amplifier architecture 300 with an antenna 360. Similar to the examples of FIGS. 1 and 2, the transceiver module 320 processes base-band signals in multiple bands, and only the Tx paths and components for three bands, band 1, band 2, and band 3, which are schematically illustrated in FIG. 3. The transceiver module 320 has single pin-outs respectively assigned for the band 1, band 2 and band 3 in this example; however, a double pin-out for each band may be used to enable a differential input of the PA 330. Each of the power amplifiers 330, PA 1, PA 2 and PA 3, is designed to have two outputs to provide 180° phase offset between two output signals, a 0° output signal and a 180° output signal, so as to provide a differential output. Such a PA with a differential output and/or a differential input may be designed based on CRLH structures that provide flexible phase selections. A differential filter 336 is coupled to each PA 330 to receive and filter the 0° and 180° output signals for each band. A 180° hybrid 340 is coupled to the filter 336 to generate an in-phase output signal from the 0° and 180° output signals and a cancelled output signal from the 0° and 180° output signals. The in-phase output signal is transmitted from one of the output pins of the 180° hybrid to a switch 350, whereas the cancelled output signal is terminated at the other output pin of the 180° hybrid. Examples of 180° hybrids include a rat-race coupler and a branch-line coupler with an additional 90° delay line. These 180° hybrids may be designed based on CRLH structures. Although all the paths associated with the band 1, band 2 and band 3 are illustrated to have differential configurations, a less number of differential configurations can be used, leaving the other paths single-ended, depending on applications and space considerations. However, in general, all differential configurations are desired for CMOS compatibility. Similar to the system of FIG. 1, this architecture 300 has the switch 360, such as a SP3T switch, to select one of the signal paths to send the signal, i.e., the enhanced in-phase output signal, in the selected band to the antenna.

Figure 4:
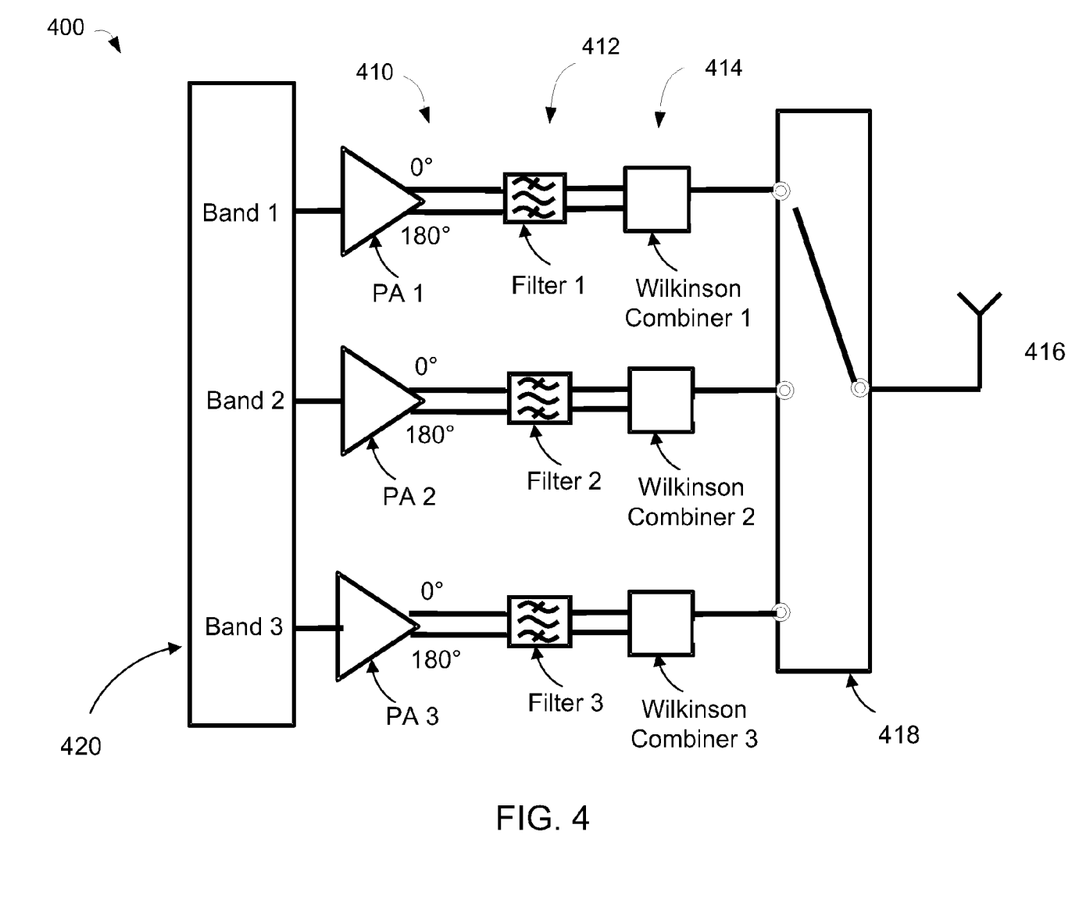
FIGS. 4, 5A-B, and 6-7 illustrate differential power amplifiers and antennas, according to example embodiments.

FIG. 4 illustrates an example of a differential power amplifier architecture 400 with an antenna 416, including transceiver module 420, PAs 410, filters 412, and switch 418 as previously described. This architecture 400 has Wilkinson power combiners 414, labeled 1, 2 and 3 instead of the 180° hybrids used in the architecture 300 of FIG. 3. Each of the Wilkinson power combiners 414 operates to combine the 0° and 180° output signals to generate an enhanced in-phase output signal. The Wilkinson power combiner 414 may be designed based on CRLH structures to include two transmission lines having phases of 90° and −90°, respectively. To obtain the in-phase output signal, other pairs of phases may be used, e.g., 270° and 90°, −90° and −270°, etc.

Figure 5A:
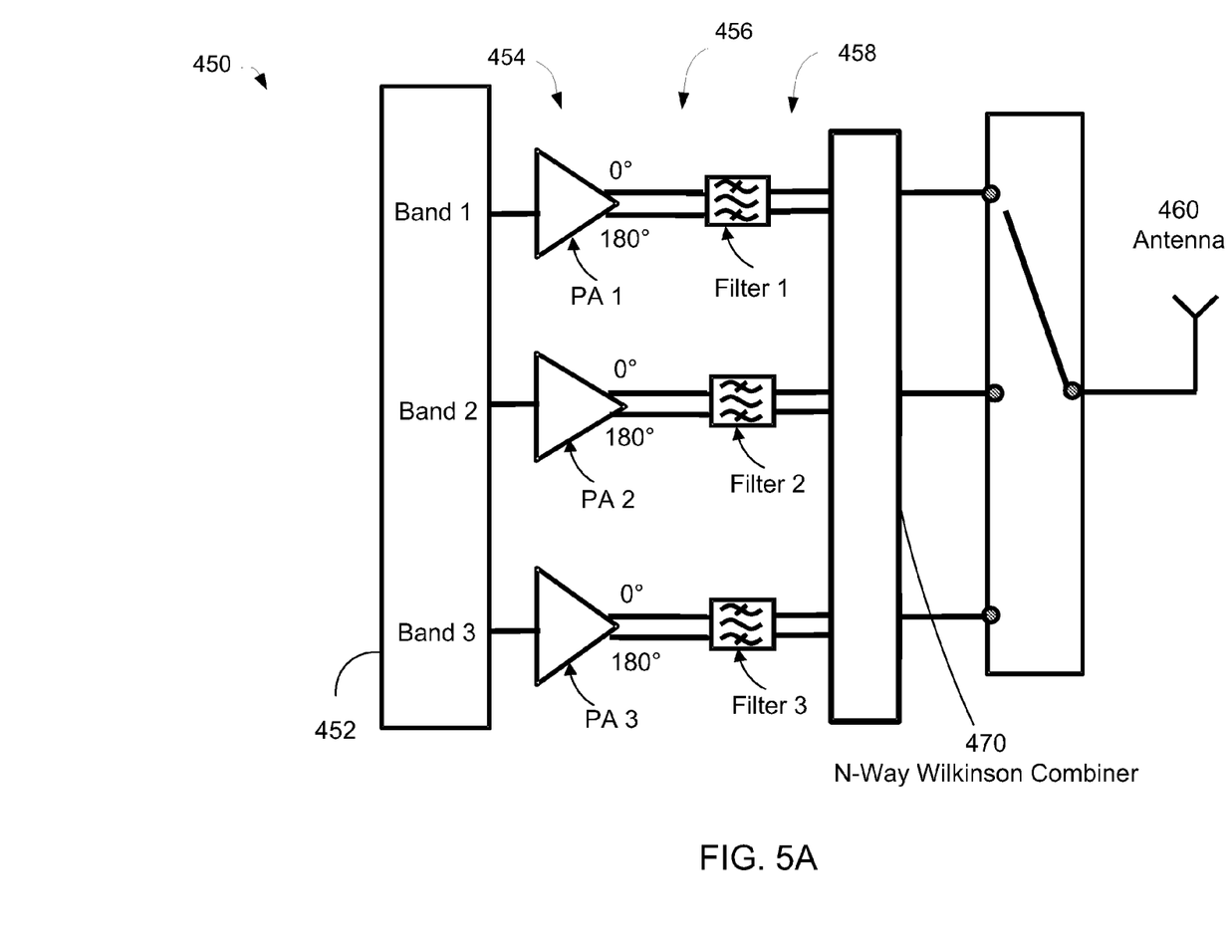

FIG. 5A illustrates an example of a differential power amplifier architecture 450 with an antenna 460, including transceiver module 452, PAs 454, filters 456, and a switch as previously described. This system has an N-way Wilkinson power combiner 470 coupled to the filters 458, labeled 1, 2 and 3. The N-way Wilkinson power combiner 470 operates to combine the 0° and 180° output signals to generate an enhanced in-phase output signal in each band, which is then transmitted to the antenna 460. The N-way Wilkinson power combiner 470 can be designed based on CRLH structures that provide flexible phase selections.

Figure 5B:
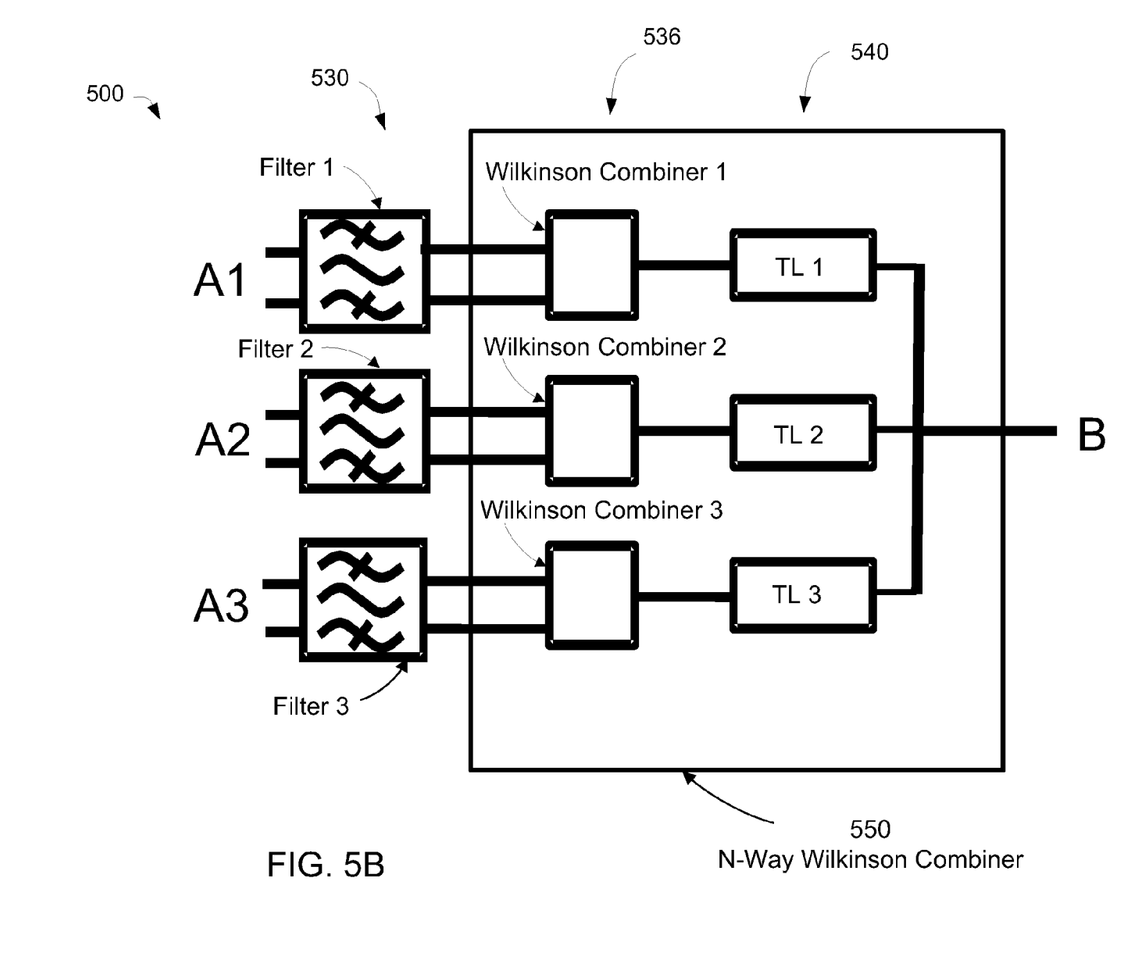

FIG. 5B illustrates an example of a differential power amplifier architecture 500 having a plurality of filters 530 coupled to an N-way Wilkinson Combiner 550. The inputs are labeled, A1, A2, A3, and the output is B. The N-Way Wilkinson Combiner 550 includes Wilkinson combiners 536, each coupled to one of multiple transmission lines 540. As illustrated, each filter 530 has multiple inputs and multiple outputs. Alternate embodiments may employ different numbers of Wilkinson combiners and transmission lines.

Figure 6:
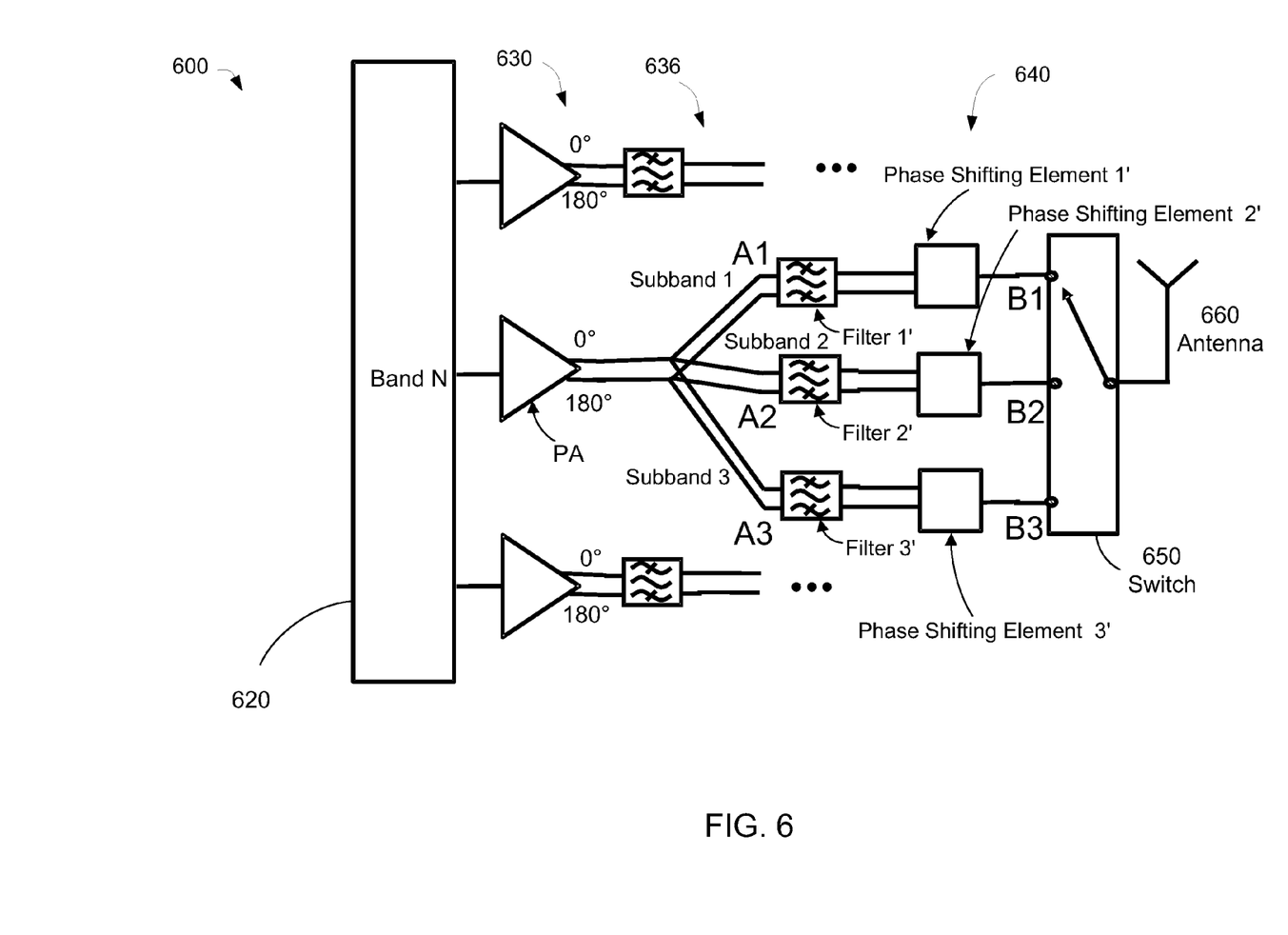

FIG. 6 illustrates an example of a differential power amplifier architecture 600 with an antenna 660. This architecture 600 includes a transceiver module 620 coupled to multiple transmitter paths, wherein a transmitter path for one band N which is structured to branch out into paths for multiple sub bands 1, 2 and 3. A signal in this band N is sent from the transceiver module 620 to a PA 630, which has two outputs to provide 180° phase offset between two output signals, a 0° output signal and a 180° output signal, so as to provide a differential output. Such a PA 630 with a differential output and/or a differential input can be designed based on CRLH structures that provide flexible phase selections. The 0° output signal and the 180° output signal are then split into the sub bands 1, 2, and 3 in this example. The number of sub bands and the frequency range of each sub band may vary depending on applications. For example, a band ranging from 1.7 GHz to 2 GHz may be comprised of a sub band 1 ranging 1920-1980 MHz, a sub band 2 ranging 1850-1910 MHz and a sub band 3 ranging 1710-1785 MHz. Differential filters 636, labeled 1', 2' and 3', are coupled to the PA 630 to receive and filter the 0° and 180° output signals for the sub bands 1, 2 and 3, respectively. At the branch point between the output paths of the PA 630 and the input paths of the filters 636, two triplexers (shown in FIG. 6 and various other figures as three branches off each of the output signals of the corresponding PA), one for the 0° output signal path and the other for the 180° output signal path, may optionally be included. These diplexers play a role of segregating and directing signals into right paths when the filters 636, labeled 1', 2' and 3', do not have sharp response characteristics so there may be overlaps between sub bands. Phase shifting elements 640, labeled 1', 2' and 3', are coupled to the respective filters 636 to generate in-phase output signals from the 0° and 180° output signals for the respective sub bands. A 180° hybrid (e.g., a rat-race coupler and a branch-line coupler with an additional 90° delay line) and a Wilkinson power combiner are examples of the phase shifting element. These phase shifting elements may be designed based on CRLH structures. This architecture 600 has a switch 650, such as an SP3T switch, coupled to the phase shifting elements 1', 2' and 3' to select one of the signal paths to send the signal, i.e., the in-phase output signal, in the selected sub band to the antenna 660.

Figure 7:
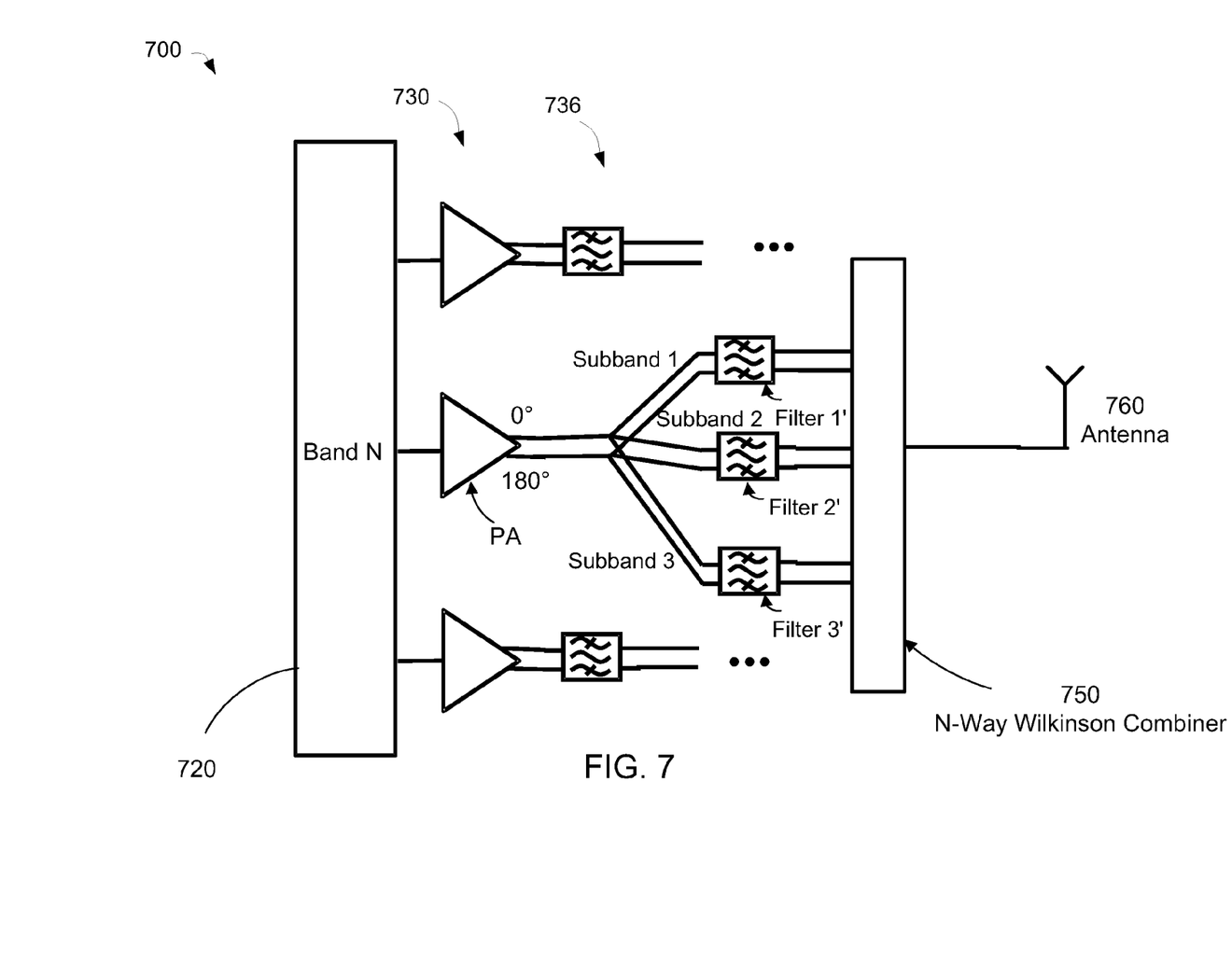

FIG. 7 illustrates an example of a differential power amplifier architecture 700 with an antenna 760 including transceiver module 720, PAs 730, filters 736, and triplexers as previously described. This architecture 700 is similar to the architecture 600 of FIG. 6, except that an N-way Wilkinson power combiner 750 is used instead of phase shifting elements and switch. The N-way Wilkinson power combiner 750 operates to combine the 0° and 180° output signals to generate an enhanced in-phase output signal in each sub band, which is then transmitted to the antenna 760. The N-way Wilkinson power combiner 750 can be designed based on CRLH structures that provide flexible phase selections.

A single antenna 760 is used for the transmitter in the examples illustrated in FIGS. 3-7. A balanced antenna with a BALUN, as shown in FIG. 2, may be used instead of the single antenna for applications where the antenna is desired to be immune to noises.

Figure 8:
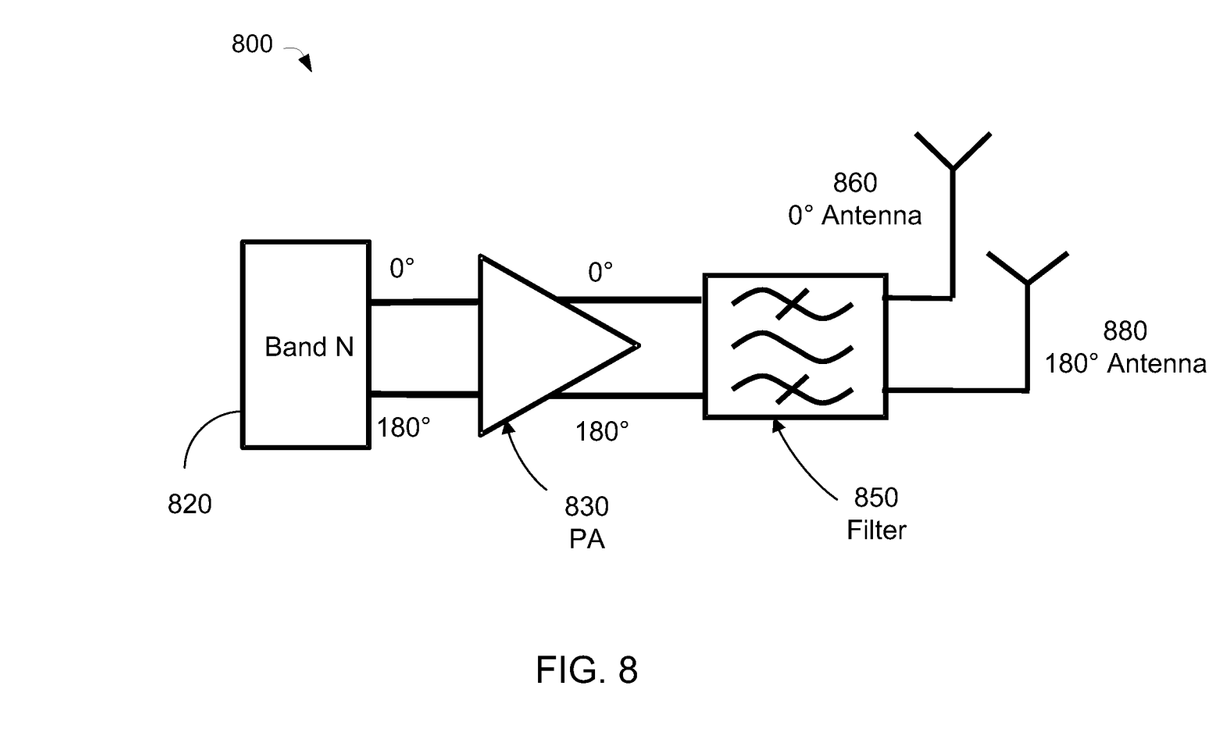
FIGS. 8, 9A-B, and 10 illustrate examples of differential power amplifier architectures with balanced antennas, according to an example embodiment.

FIG. 8 illustrates an example of a differential power amplifier architecture 800 with a balanced antenna 880. The balanced antenna 880 has a 0° antenna and a 180° antenna without a BALUN to transmit 0° and 180° output signals, respectively. Only the Tx path associated with the band N is schematically shown in this figure. The architecture 800 is structured to have a differential configuration throughout. The pin-outs of the transceiver 820 for the band N are structured differentially. The PA 830 is designed to have differential inputs and outputs. Such a PA 830 may be designed based on CRLH structures. A differential filter 850 is coupled to the PA 830. The 0° and 180° output signals are respectively sent to the 0° and 180° antennas, 860, 880.

Figure 9A:
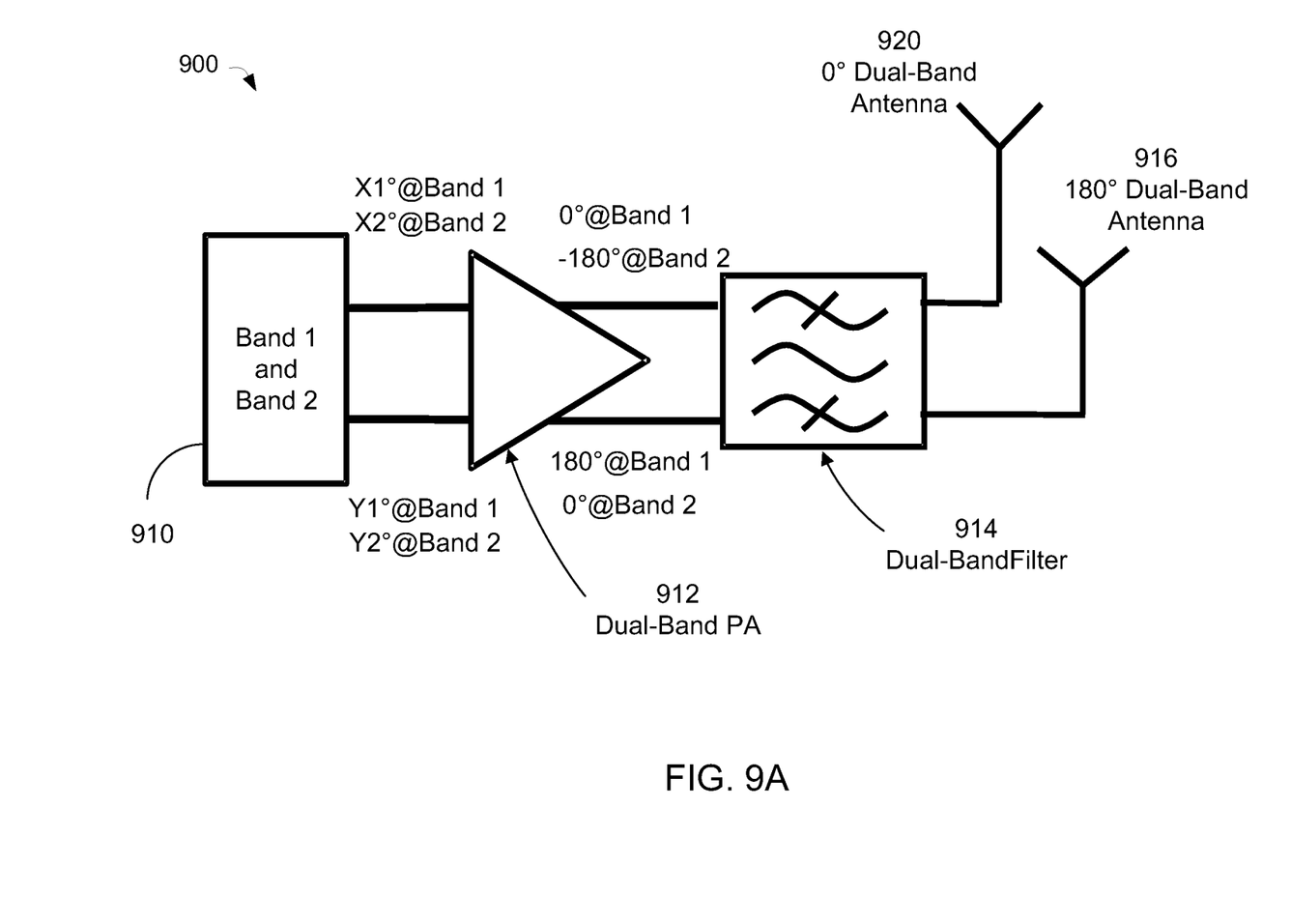

FIG. 9A illustrates an example of a differential power amplifier architecture 900 with a dual-band balanced antenna 916, 920. The dual-band balanced antenna 916, 920 includes a 0° dual-band antenna 920 and a 180° dual-band antenna 916 without a BALUN to transmit 0° and 180° output signals for the dual band, respectively. Only the Tx path associated with the bands 1 and 2 is schematically shown in this figure. The architecture 900 is structured to have a differential configuration throughout. The pin-outs of the transceiver 910 for the dual band, band 1 and band 2, are structured differentially. The PA 912 is designed to operate for the dual band and have differential inputs and outputs. The phases associated with the differential paths may be chosen to have 0° in the band 1 and −180° in the band 2 along one path and 180° in the band 1 and 0° in the band 2 along the other path. Here, the band 1 is assumed to be lower in frequency than the band 2. In general, phase is a decreasing function of frequency. A dual-band differential PA may be designed based on CRLH structures by utilizing the flexible phase selection capability. A dual-band differential filter 914 is coupled to the PA 912. The 0° output signal in the band 1 and the −180° output signal in the band 2 are sent to the 0° dual-band antenna 916, 920, whereas the 180° output signal in the band 1 and the 0° output signal in the band 2 are sent to the 180° dual-band antenna.

Figure 9B:
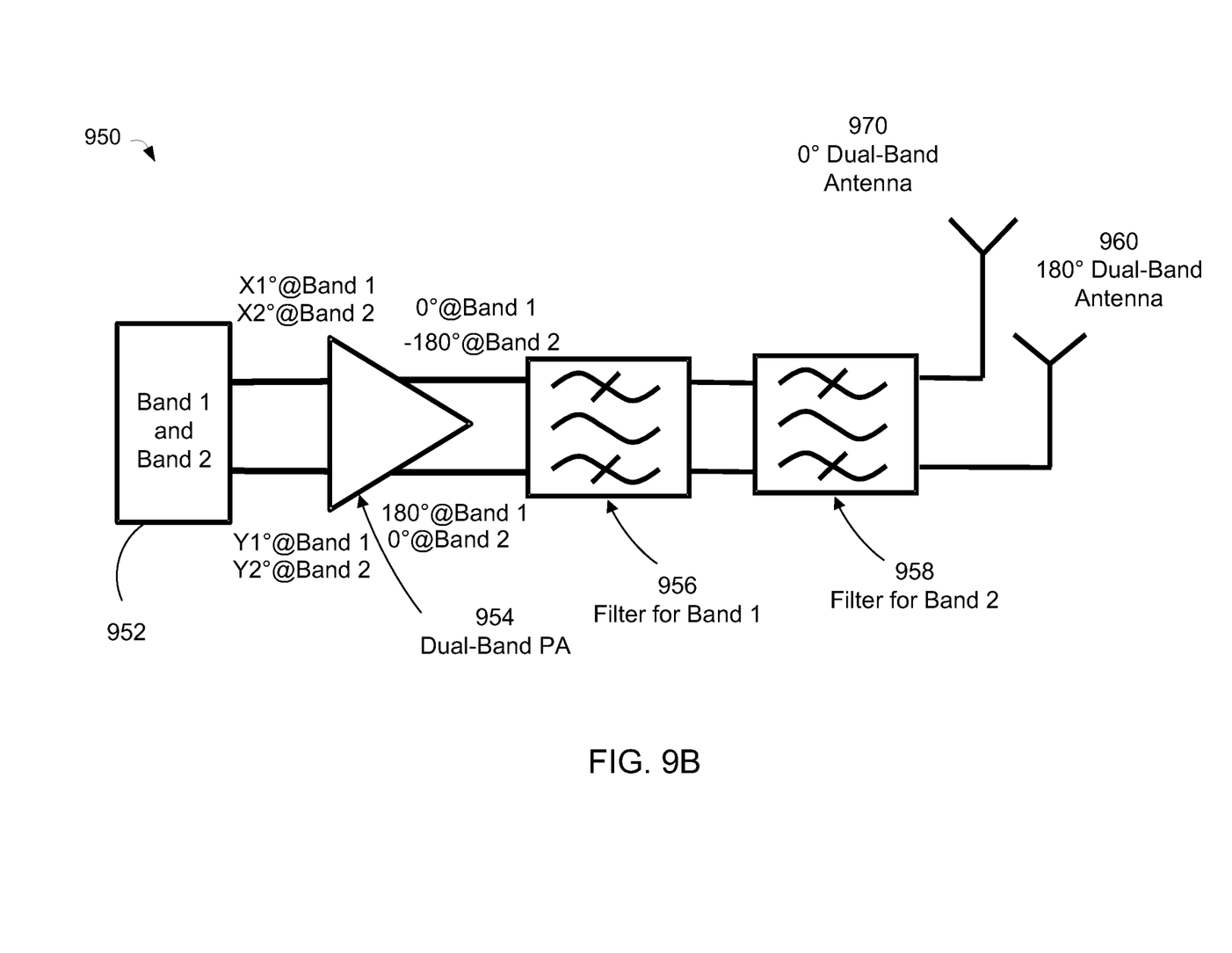

FIG. 9B is a structure 950 having a transceiver 952 supporting multiple frequency bands. The transceiver 952 is coupled to the power amplifier 954 which outputs the bands with the phase offset as indicated in FIG. 9B. The power amplifier is coupled to multiple filters, a first filter 956 to filter band 1, and second filter 958 to filter band 2. The second filter 958 is coupled to multiple antennas, 970, 960.

Figure 10:
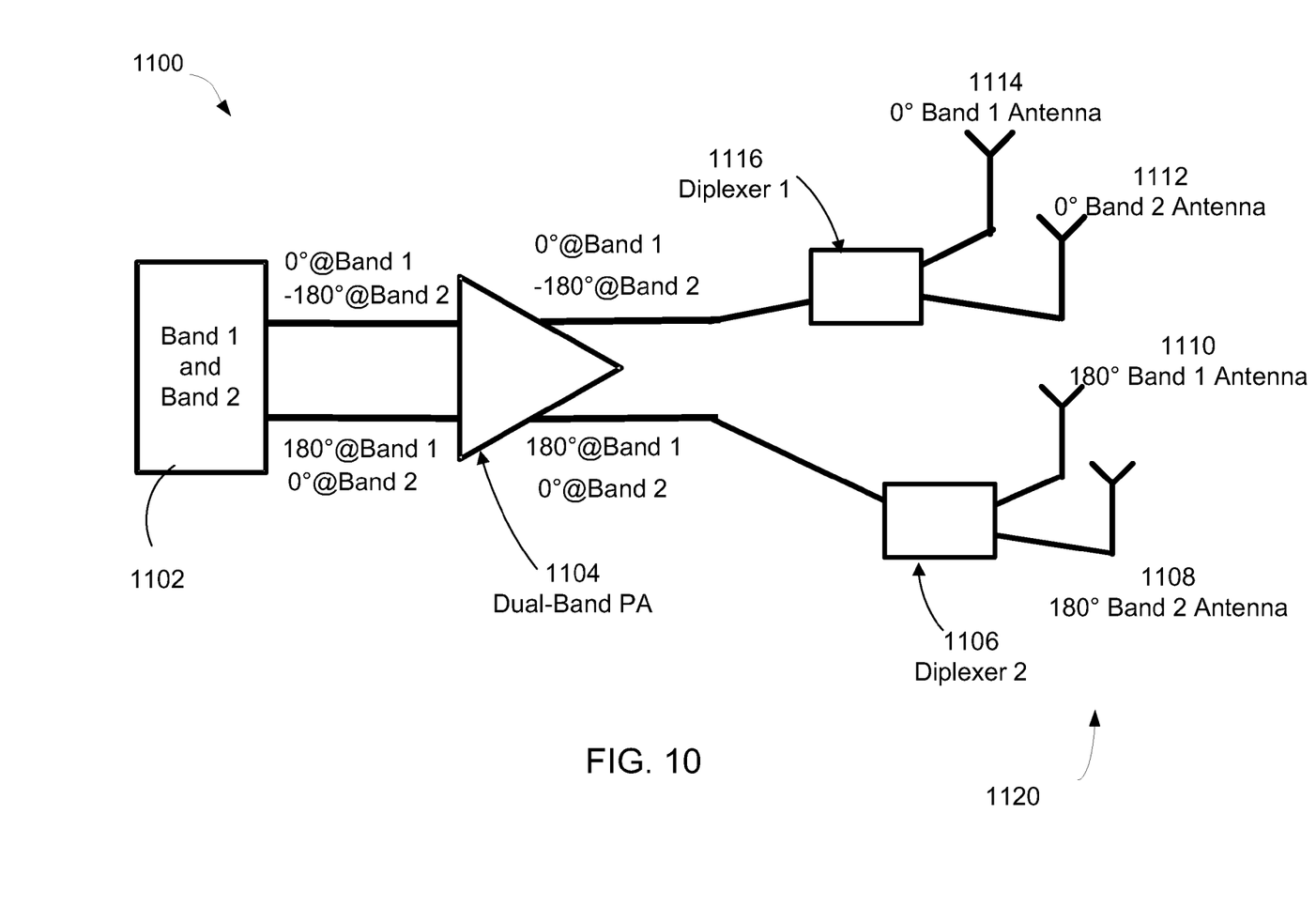

FIG. 10 illustrates an example of a differential power amplifier architecture 1100 with a transceiver module 1102 and balanced antennas 1120. The balanced antennas 1120 include: one pair of a 0° antenna 1114 and a 180° antenna 1110 without a BALUN for the band 1 to transmit 0° and 180° output signals for the band 1, respectively; and another pair of a 0° antenna 1112 and a 180° antenna 1108 without a BALUN for the band 2 to transmit 0° and 180° output signals for the band 2, respectively. Only the Tx path associated with the bands 1 and 2 is schematically shown in this figure. Similar to the system of FIG. 9A, this architecture 1100 is structured to have a differential configuration throughout; the pin-outs of the transceiver for the dual band, band 1 and band 2, are structured differentially; and the PA 1104 is designed to operate for the dual band and have differential inputs and outputs based on CRLH structures. The phases associated with the differential paths may be chosen to have 0° in the band 1 and −180° in the band 2 along one path and 180° in the band 1 and 0° in the band 2 along the other path. Here, the band 1 is assumed to be lower in frequency than the band 2. Diplexers, diplexer 1 1116 and diplexer 2 1106, are placed on differential paths. The diplexer 1 1116 is coupled to the 0° output of the PA 1104 to direct the 0° output signals in the band 1 and the band 2 to the 0° band 1 antenna 1114 and the 0° band 2 antenna 1112, respectively. The diplexer 2 1106 is coupled to the 180° output of the PA 1104 to direct the 180° output signals in the band 1 and the band 2 to the 180° band 1 antenna 1110 and the 180° band 2 antenna 1108, respectively.

Figure 11:
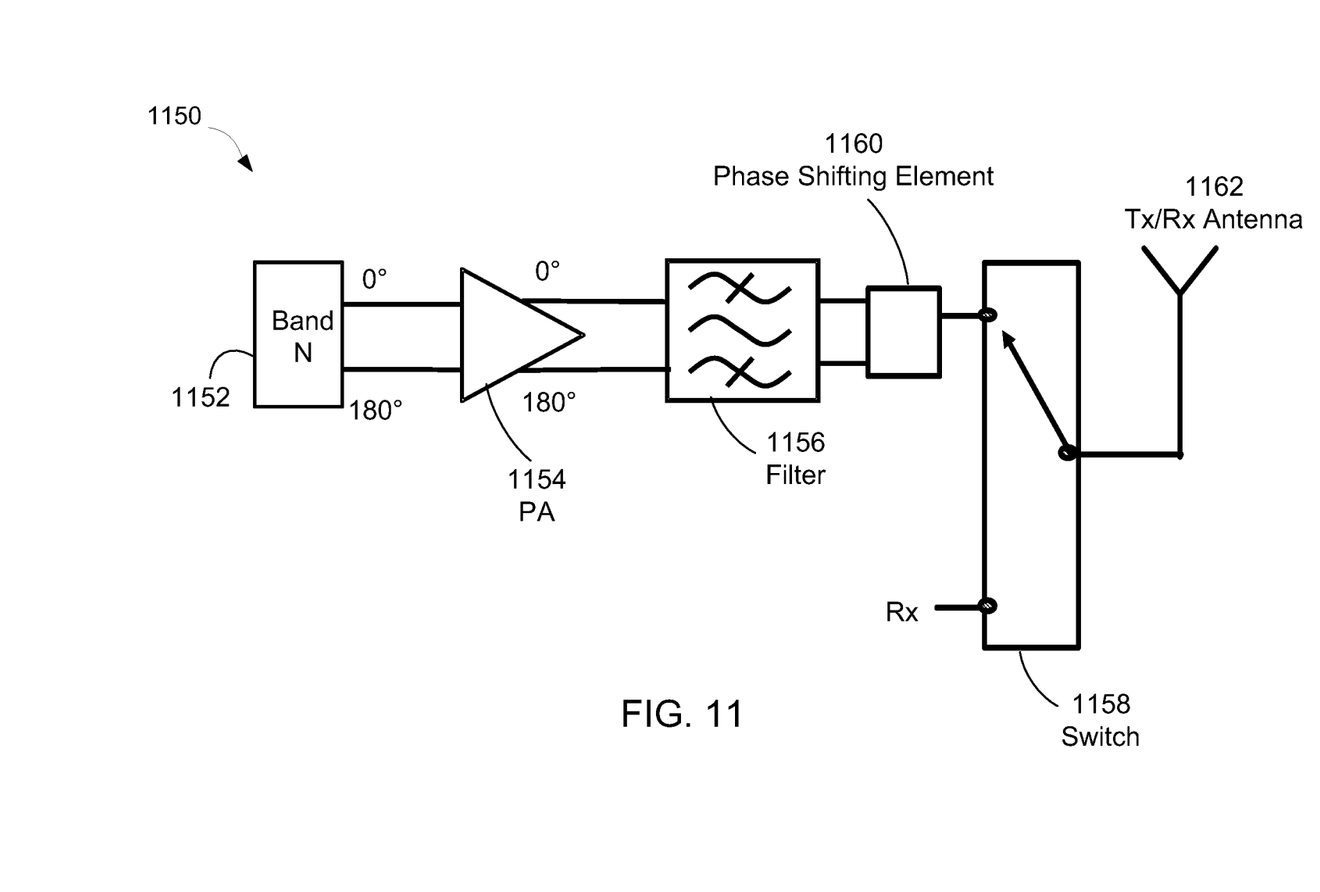
FIGS. 11-13 illustrate examples of differential power amplifier architectures with antenna configurations, according to an example embodiment.

FIG. 11 illustrates an example of a differential power amplifier architecture 1150 with a Tx/Rx antenna 1162, including a transceiver module 1152, a PA 1154, and a filter 1156 as described previously. Part of the Rx path is shown in this architecture 1100 to indicate that the switch 1158 is used to select a Tx path or a Rx path depending on the operation mode of the Tx/Rx antenna 1162. The Tx path associated with the band N includes the similar component as in the system of FIG. 3 or FIG. 4, where the phase shifting element 1160 may be a 180° hybrid (e.g., a rat-race coupler and a branch-line coupler with an additional 90° delay line), a Wilkinson power combiner, or any other suitable phase shifting device to generate in-phase signals. The pin-outs of the transceiver for the band N are structured to be differential in this example, but a single-ended pin-out may also be used.

Figure 12:
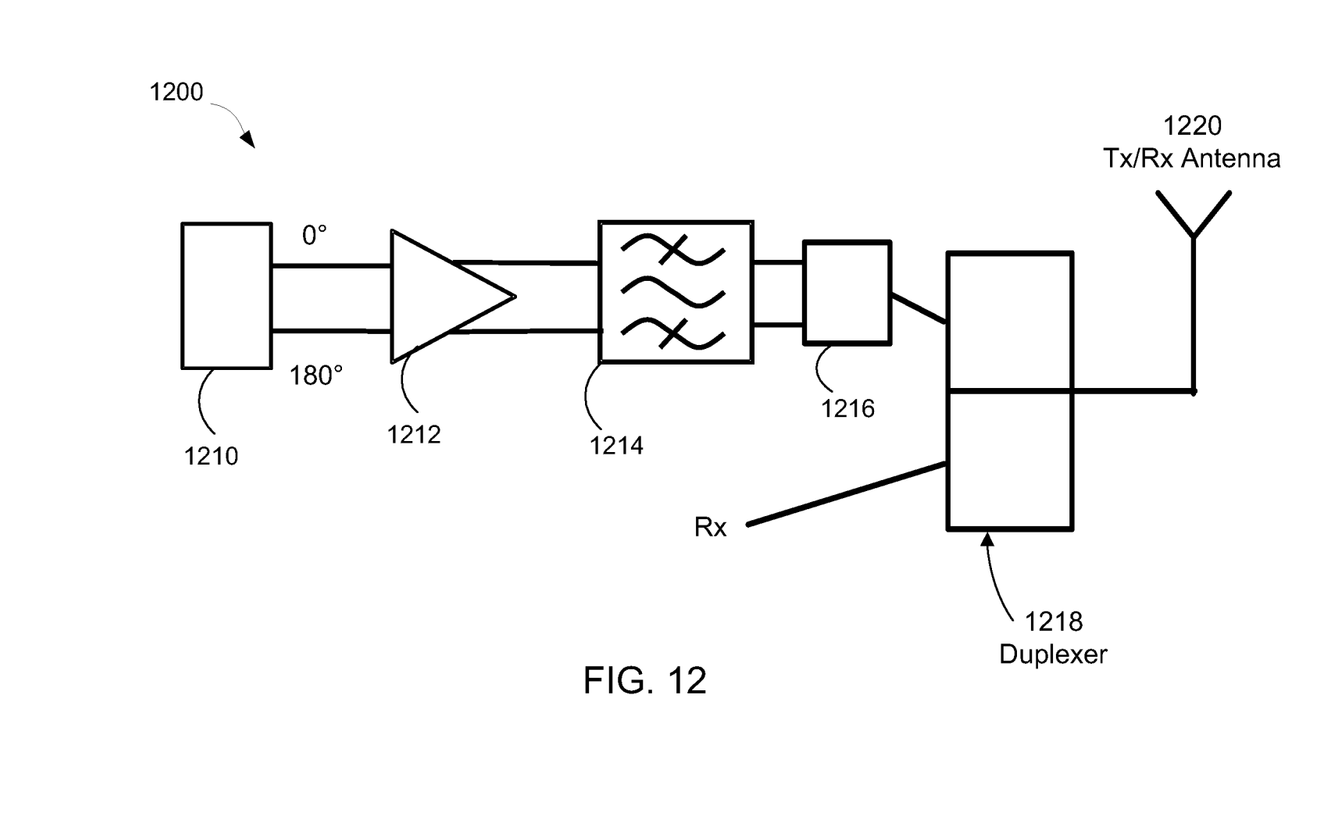

FIG. 12 illustrates an example of a differential power amplifier architecture 1200 with a Tx/Rx antenna 1220. This architecture 1200 is similar to the system of FIG. 11, including a transceiver module 1210, a PA 1212, a filter 1214 and a phase shifter 1216 as described previously, except that a duplexer 1218 is used for the selection of a Tx path or a Rx path. Note that the dual-band scheme illustrated in this document can be extended to a multiband scheme by utilizing, for example, extended-CRLH (E-CRLH) structures. Techniques to design CRLH-based RF components for dual-band and multiband operations are described in the aforementioned US patent applications.

Figure 13:
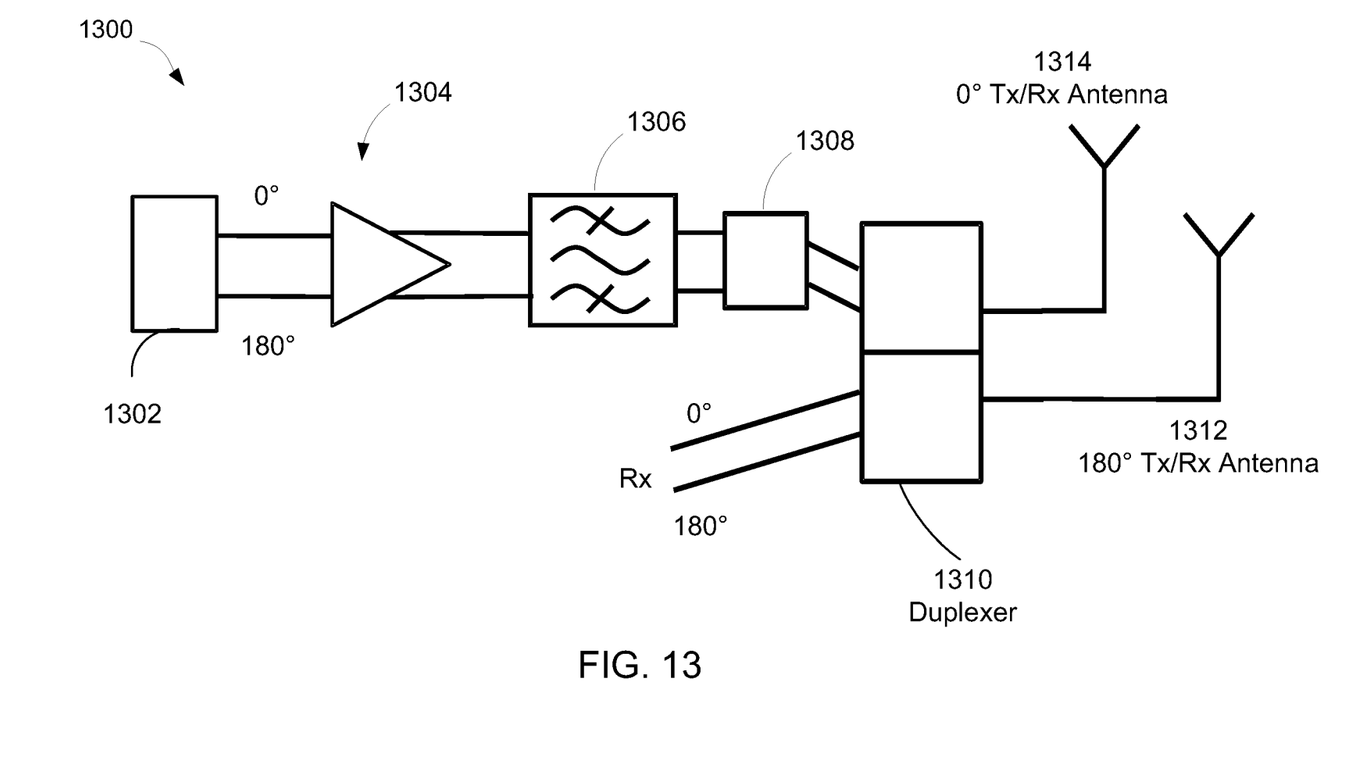

FIG. 13 illustrates a differential power amplifier 1300 having a transceiver 1302 coupled to PA 1304 filter 1306, and phase shifter 1308. The architecture 1300 incorporates a duplexer 1310 coupled to two antennas 1314, 1312. A receive path is provided from duplexer 1310 for 0° and 180° signals.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination. Only a few implementations are disclosed. However, it is understood that variations and enhancements may be made.

The claimed invention is:

1. A differential power amplifier structure, comprising:
a transceiver module supporting multiple frequency band signals;
a plurality of power amplifiers coupled to the transceiver module, each of the plurality of power amplifiers having at least two outputs having 180° phase offset therebetween;
a plurality of filters coupled to the plurality of power amplifiers;
a plurality of hybrid units coupled to the plurality of filters, each of the hybrid units having two inputs to receive the 180° phase offset signals from a corresponding one of the plurality of filters, each of the hybrid units to generate an in-phase output signal from received signals;
a switch coupled to the plurality of hybrid units to select a transmission path.

2. The differential power amplifier structure of claim 1, further comprising:
the plurality of hybrid units generate a cancelled output signal from received signals.

3. The differential power amplifier structure of claim 1, wherein the plurality of hybrid units include at least one rat-race coupler.

4. The differential power amplifier structure of claim 1, wherein the plurality of hybrid units include at least branch-line coupler with an additional 90° delay line.

5. The differential power amplifier structure of claim 1, further comprising a plurality of Wilkinson combiners coupled between the plurality of filters and the switch.

6. The differential power amplifier structure of claim 5, wherein at least one of the plurality of Wilkinson combiners is a Composite Right Left Hand (CRLH) structured device.

7. The differential power amplifier structure of claim 6, wherein the at least one of the plurality of Wilkinson combiners includes two transmission lines having phases of 90° and −90°, respectively.

8. The differential power amplifier structure as in claim 1, further comprising:
a diplexer coupled to one of the plurality of power amplifiers, the diplexer having multiple outputs, each coupled to a switch through a filter and a phase shift element.

9. The differential power amplifier structure as in claim 1, wherein the switch is a Wilkinson combiner.

10. The differential power amplifier structure as in claim 1, wherein the differential power amplifier structure includes at least one Composite Right Left Hand (CRLH) structure.

11. The differential power amplifier structure as in claim 1, wherein the switch is an N-way Wilkinson combiner.

12. The differential power amplifier structure as in claim 1, wherein the switch is a duplexer.

13. A differential power amplifier structure, comprising:
a transceiver module supporting multiple frequency band signals;
a power amplifier coupled to the transceiver module, the power amplifier having at least first and second outputs having 180° phase offset therebetween;
a first diplexer coupled to the power amplifier to receive the first output, and coupled to a first and a second antenna element; and
a second diplexer coupled to the power amplifier to receive the second output, and coupled to a third and a fourth antenna element.

14. The differential power amplifier structure as in claim 13, wherein the first and third antenna elements support a first frequency band, and the second and fourth antenna elements support a second frequency band.

15. The differential power amplifier structure as in claim 13, wherein the first and second antenna elements have a 180° phase offset from the third and fourth antenna element.

16. A differential power amplifier structure, comprising:
a transceiver supporting multiple frequency bands;
a power amplifier coupled to the transceiver, the power amplifier having two outputs with a 180° phase offset;
a filter coupled to receive the two outputs of the power amplifier;
a phase shifting element coupled to the filter; and
a switch coupled to the phase shifting element at a first port and having a second port coupled to a receive path, the switch to select between the first port and the second port.

17. The differential power amplifier structure as in claim 16, wherein the switch is adapted for coupling to a plurality of antennas, the plurality of antennas having a phase offset of 180°.

18. The differential power amplifier structure as in claim 16, wherein the differential power amplifier structure includes at least one Composite Right Left Hand (CRLH) structure.

19. The differential power amplifier structure as in claim 18, wherein the CRLH structure is an Extended-CRLH (E-CRLH) structure.

20. A method for differential power amplification of Radio Frequency (RF) signals, comprising:
providing a plurality of signals to a plurality of power amplifiers;
amplifying a first signal in a first frequency band to provide a first amplified signal having a first phase value;
amplifying a second signal in a second frequency band to provide a second amplified signal having a second phase value, wherein the second phase value has a 180° phase offset from the first amplified signal;
filtering the first and second amplified signals to provide filtered signals; and
selecting transmission paths for each of the filtered signals.

21. The method of claim 20, further comprising:
providing the filtered signals to a plurality of hybrid units;
generating in-phase output signals from the filtered signals; and'
generating cancelled output signals from the filtered signals.

22. The method of claim 21, wherein amplifying the first and second signals is performed by a Composite Right Left Hand (CRLH) structured differential power amplifier module.

* * * * *